C. BARTEL.
GRASS LINE TRIMMER FOR RAILWAYS.
APPLICATION FILED MAR. 19, 1908.

913,348.

Patented Feb. 23, 1909.
2 SHEETS—SHEET 1.

Witnesses
James F. Crown
M. L. Skinner

Inventor
Charles Bartel
By Watson E. Coleman
Attorney

C. BARTEL.
GRASS LINE TRIMMER FOR RAILWAYS.
APPLICATION FILED MAR. 19, 1908.
913,348.
Patented Feb. 23, 1909.
2 SHEETS—SHEET 2.
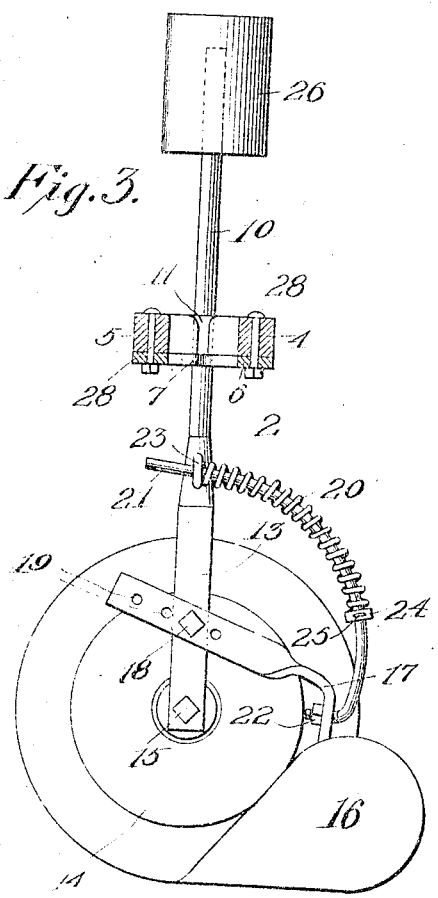
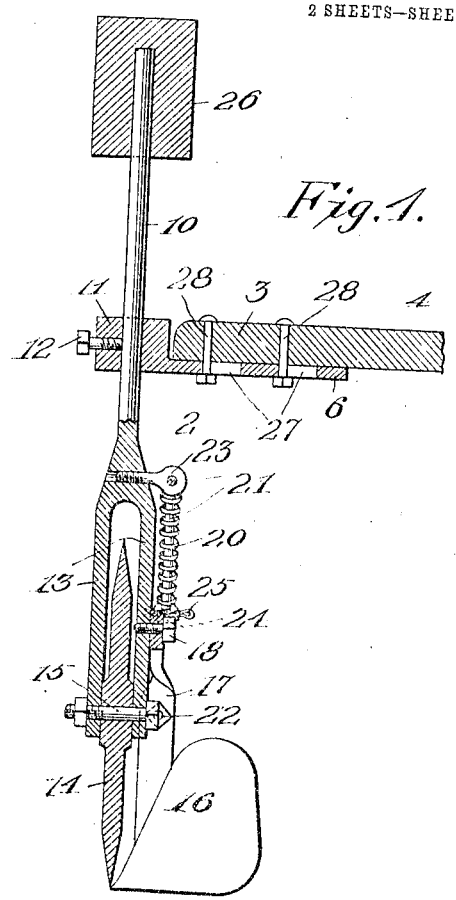
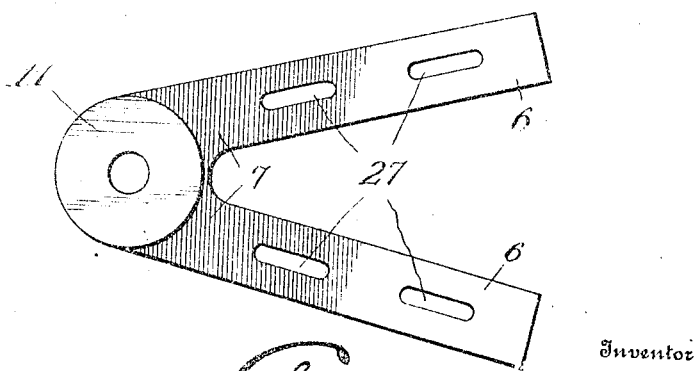
Witnesses
James F. Crown
M. L. Skinner
Inventor
Charles Bartel
By Watson E. Coleman
Attorney

UNITED STATES PATENT OFFICE.

CHARLES BARTEL, OF BROOKFIELD, WISCONSIN.

GRASS-LINE TRIMMER FOR RAILWAYS.

No. 913,348.    Specification of Letters Patent.    Patented Feb. 23, 1909.

Application filed March 19, 1908. Serial No. 422,158.

*To all whom it may concern:*

Be it known that I, CHARLES BARTEL, a citizen of the United States, residing at Brookfield, in the county of Waukesha and State of Wisconsin, have invented certain new and useful Improvements in Grass-Line Trimmers for Railways, of which the following is a specification, reference being had to the accompanying drawings.

My invention relates to improvements in devices for trimming the grass line along a railway track, and it consists of the novel features of construction and the combination and arrangement of parts hereinafter fully described and claimed.

One object of the invention is to provide a device of this character in the form of an attachment which may be readily applied to and removed from an ordinary railway hand car.

Another object of the invention is to provide a device of this character which is simple and practical in construction, easy to adjust and use, and which will effectively accomplish its intended purpose.

The above and other objects of the invention are attained in its preferred embodiment illustrated in the accompanying drawings, in which—

Figure 1:
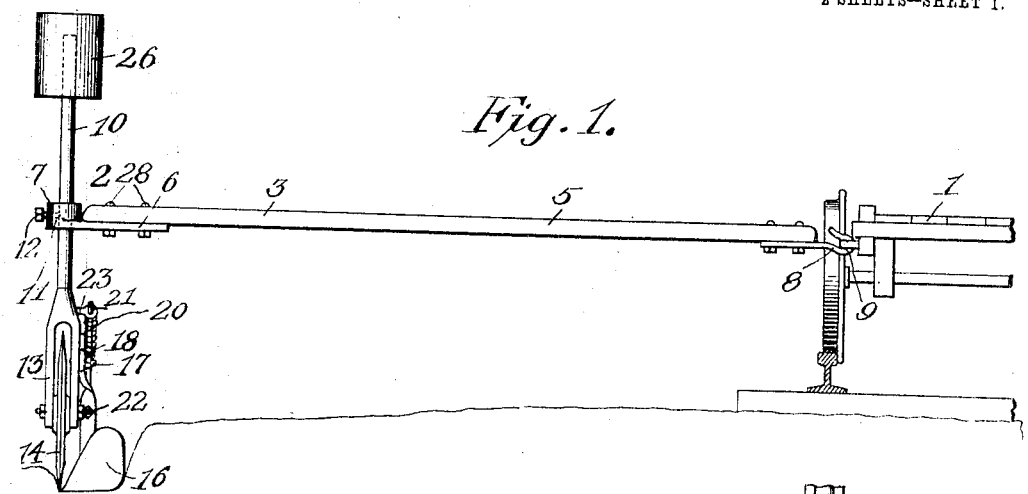
Figure 2:
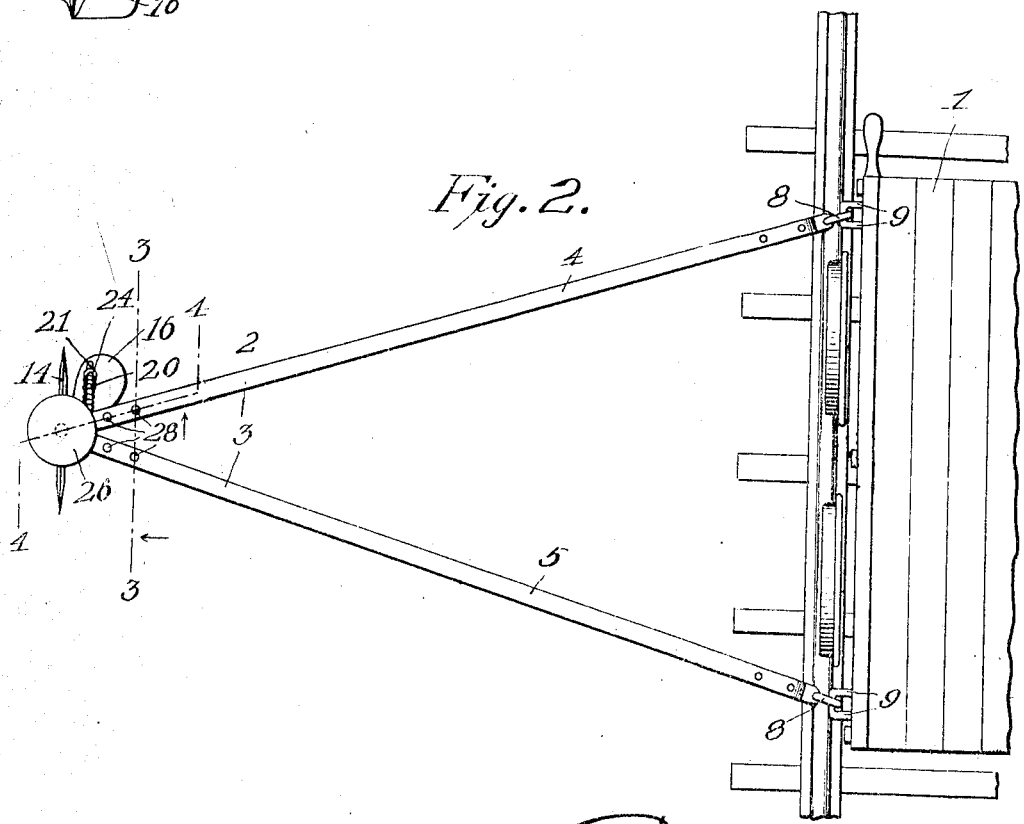

Figure 1 is a front elevation of my improved grass line trimmer showing it applied to a hand car; Fig. 2 is a top plan view of the same; Fig. 3 is an enlarged vertical section taken on the plane indicated by the line 3—3 in Fig. 2; Fig. 4 is a detail vertical section taken on the plane indicated by the line 4—4 in Fig. 2; and Fig. 5 is a detail view of the adjustable standard support.

In the drawings 1 denotes a portion of a railway hand car or any other wheeled support or vehicle adapted to travel upon a railway track and 2 denotes my improved grass line trimmer which is here shown in the form of an attachment for the car or support 1.

The invention comprises a vertically swinging, horizontally disposed frame 3 which may be detachably hinged upon either side of the car and which projects laterally therefrom and carries the marking and trimming implements hereinafter described. The frame 3 is preferably composed of two beams or bars 4, 5 which have their converging outer ends united to angularly disposed arms 6 of a connecting and supporting member 7, and their diverging inner ends provided with hooks 8 to detachably engage staples 9 or equivalent keeper loops or eyes arranged upon the side of the car 1, adjacent its ends. The hooks or hinge members 8 are preferably in the form of metal straps permanently or adjustably bolted to the beams 4, 5 and having their projecting hook-shaped ends bent upwardly and outwardly, as clearly shown in Fig. 1. By constructing the hinge members in this manner it will be seen that the frame 3 must be held in an upwardly and outwardly inclined angular position while it is being attached to or detached from the car, and that when it is dropped to a horizontal position there will be no danger of the hinge members separating.

The member 7 which connects the outer ends of the beams or bars 4, 5 forms a support for a vertically adjustable standard 10. The latter extends through and is adapted to slide in a vertically disposed sleeve 11 on the member 7 and it is secured therein in an adjusted vertical position by a set screw 12 or any equivalent fastening means. The lower end of the standard is bifurcated or forked to provide spaced arms 13 which receive a colter wheel or disk 14. The latter is journaled upon a pivot bolt 15 arranged in the lower ends of the fork arms 13 and it is adapted to travel in advance of a plow 16 arranged upon the lower end of a curved beam 17, the upper end of which is pivoted at 18 to one of the arms 13 of the standard. The pivot 18 is preferably in the form of a bolt and a series of apertures 19 are formed in the plow beam so that the latter may be adjusted. The plow is forced into the ground by a coil spring 20 arranged upon an arc-shaped guide rod 21 in the form of a bolt having one end fixed at 22 to the plow beam and its other or free end projecting through and sliding in a guide 23 in the form of an eye bolt or screw arranged in the lower forked portion of the standard. The coil spring 20 is confined between the guide 23 and a fixed stop 24 in the form of a washer held against movement upon the guide rod or bolt by a cotter pin 25. The colter disk or wheel is forced into the ground by providing a weight 26 which is removably arranged upon the upper end of the standard 10.

For the purpose of enabling the colter wheel and plow to trim the grass line at different distances from the track rails, I may make the frame 3 adjustable in any suitable manner, but I preferably form the arms 6 of the coupling and supporting member 7 with longitudinal slots 27 to receive bolts 28, which latter also pass through the beams or bars 4, 5, as clearly shown in Fig. 4.

In operation, it will be seen that when the attachment is applied to the car, as shown in Figs. 1 and 2, and the latter is moved along the track, the colter wheel or disk will cut a straight line in the ground or turf along the track and the plow will turn over the ground upon the inner side of said colter disk. The device will therefore effectively cut a straight line in the grass at the side of the track. Owing to the various adjustments, the cutting implements may be disposed at the desired distance from the track rails and will effectively operate upon road beds that are inclined or slanting at their sides. The peculiar construction of the device renders it light and easy in operation and enables it to be quickly and easily applied to or detached from the car.

While I have shown and described in detail the preferred embodiment of my invention it will be understood that I do not limit myself to the precise construction set forth and that various changes in the form, proportion, and minor details may be resorted to without departing from the spirit or sacrificing any of the advantages of the invention.

Having thus described my invention what I claim is:

1. In a grass line trimmer for railways, the combination of a vertically swinging frame, means for hinging the inner end of the same to a car, a standard upon the outer end of the frame, a colter wheel carried by the standard, a plow, a beam for the latter pivoted to the standard and a spring for actuating said beam downwardly.

2. In a grass line trimmer for railways, the combination of a vertically swinging frame, means for hinging the inner end of the same to a car, a standard upon the outer end of the frame, a colter wheel carried by the standard, a plow, a beam for the latter pivoted to the standard, a guide upon the standard, an arc-shaped rod carried by the plow beam and slidable in said guide, a stop upon said rod and a coil spring surrounding said rod between said stop and said guide.

3. In a grass line trimmer for railways, the combination of a vertically swinging frame, means for hinging the inner end of the frame to a car, a standard upon the outer end of the frame, a colter wheel upon the lower end of the standard, a pivotally mounted spring pressed plow carrying beam upon the standard and means for weighting the outer portion of the frame.

4. In a grass line trimmer for railways, the combination of a vertically swinging frame for attachment to a car, a standard vertically slidable in the outer end of the frame, means for securing said standard in an adjusted position, a colter wheel journaled upon the lower portion of the standard, a plow, a beam for the latter pivoted to the standard, a guide upon the standard, a guide rod carried by the beam and slidable in said guide, a coil spring surrounding said rod and engaged with said guide, and a removable weight upon the upper end of the standard.

5. In a grass line trimmer for railways, the combination with a car, of hinge eyes upon the latter, converging beams having upwardly and outwardly turned hinge hooks at their inner ends to engage said hinge eyes, a member having a vertically disposed sleeve and slotted angularly disposed arms, bolts passed through the converging ends of said beams and the slots in said arms, a standard vertically slidable in said sleeve, a set screw for retaining said standard in an adjusted position, and a cutting apparatus upon the lower portion of the standard.

In testimony whereof I hereunto affix my signature in the presence of two witnesses.

CHARLES BARTEL.

Witnesses:
W. M. ALVORD,
CHAS. WANDRINDER.